(12) United States Patent
Barkan

(10) Patent No.: US 6,854,655 B2
(45) Date of Patent: *Feb. 15, 2005

(54) TWO WINDOW OPTICAL SCANNER

(75) Inventor: Edward Barkan, Miller Place, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/667,692

(22) Filed: Sep. 22, 2003

(65) Prior Publication Data

US 2004/0056099 A1 Mar. 25, 2004

Related U.S. Application Data

(63) Continuation of application No. 09/824,961, filed on Apr. 3, 2001, now Pat. No. 6,631,845.

(51) Int. Cl.[7] .................................................. G06K 7/10
(52) U.S. Cl. ............................ 235/462.4; 235/462.14; 235/462.17; 235/462.3; 235/462.36; 235/462.37; 235/462.38; 235/462.39; 235/476
(58) Field of Search ........................ 235/462.4, 462.14, 235/462.17, 462.3, 462.36, 462.37, 462.38, 462.39, 476, 435, 461, 462.2

(56) References Cited

U.S. PATENT DOCUMENTS

| | | | |
|---|---|---|---|
| 3,978,317 A | 8/1976 | Yamaguchi et al. ... | 235/462.38 |
| 4,871,904 A | 10/1989 | Metlitsky et al. ...... | 235/462.38 |
| 5,206,491 A * | 4/1993 | Katoh et al. .............. | 235/462.4 |
| 5,229,588 A | 7/1993 | Detwiler et al. ............ | 235/467 |
| 5,343,029 A * | 8/1994 | Katoh et al. ........... | 235/462.39 |
| 5,459,308 A | 10/1995 | Detwiler et al. ............ | 235/467 |
| 5,475,207 A * | 12/1995 | Bobba et al. ............ | 235/462.4 |
| 5,532,467 A | 7/1996 | Roustaei ................. | 235/462.42 |
| 5,668,803 A | 9/1997 | Tymes et al. ................ | 370/312 |
| 5,684,289 A | 11/1997 | Detwiler et al. ........ | 235/462.35 |
| 5,705,802 A | 1/1998 | Bobba et al. ................ | 235/467 |
| 5,717,195 A | 2/1998 | Feng et al. .................. | 235/470 |
| 5,744,815 A | 4/1998 | Gurevich et al. ........... | 250/566 |
| 5,886,336 A | 3/1999 | Tang et al. ............ | 235/462.43 |
| 5,892,214 A | 4/1999 | Lindacher et al. ..... | 235/462.32 |
| 5,909,300 A | 6/1999 | Araki et al. ................. | 359/201 |
| 5,975,417 A | 11/1999 | Spencer et al. ........ | 235/462.36 |
| 5,978,772 A | 11/1999 | Mold .......................... | 705/16 |
| 6,045,046 A | 4/2000 | Detwiler ................. | 235/114 |
| 6,285,383 B1 | 9/2001 | Klement et al. ............ | 347/116 |
| 6,330,974 B1 | 12/2001 | Ackley .................. | 235/472.01 |
| 6,462,880 B1 | 10/2002 | Ohkawa et al. ............. | 359/629 |
| 6,491,224 B2 | 12/2002 | Ohkawa et al. .......... | 235/462.4 |
| 6,631,845 B2 * | 10/2003 | Barkan ..................... | 235/462.4 |
| 2002/0043564 A1 | 4/2002 | Ohkawa et al. .......... | 235/462.4 |
| 2002/0162887 A1 | 11/2002 | Detwiller ................. | 235/462.4 |

FOREIGN PATENT DOCUMENTS

JP 403075887 3/2004

\* cited by examiner

*Primary Examiner*—Karl D. Frech
*Assistant Examiner*—Daniel Walsh
(74) *Attorney, Agent, or Firm*—Hogan and Hartson LLP

(57) ABSTRACT

The invention relates to a scanning device for reading bar code symbols, wherein the scanning device comprises a housing having a substantially horizontal surface and a substantially vertical surface. A motor rotates a polygon mirror, which reflects a light beam from a light source and redirects it toward a mirror array and out a window in the substantially horizontal window. Another motor rotates another polygon mirror, which reflects a light beam from a second light source and redirects it toward a second mirror array and out a window in the substantially vertical surface. A plurality of sensors detects light reflected back from a bar code and generates a plurality of electrical signals proportional to the intensity of the reflected light.

16 Claims, 5 Drawing Sheets

TWO WINDOW OPTICAL SCANNER

CROSS REFERENCE TO RELATED APPLICATIONS

This application is a continuation application of application Ser. No. 09/824,961 filed on Apr. 3, 2001 and entitled "Two Window Optical Scanner", which is now U.S. Pat. No. 6,631,845.

FIELD OF THE INVENTION

The present invention relates to optical scanners and particularly to a scanner with at least two windows for scanning objects from different angles.

BACKGROUND OF THE INVENTION

Slot scanners are often used to read and decode bar codes which are disposed on various items. An example of a slot scanner is shown in U.S. Pat. No. 5,717,195, incorporated herein by reference. Two-window slot scanners essentially have a horizontal window and a vertical or generally vertical (referred to as "vertical" hereinafter) window on two surfaces of a generally L-shaped housing. Projecting generally upward out of the horizontal window is a light beam that creates a first set of scan lines while projecting generally horizontally out of the vertical window is a light beam that creates a second set of scan lines. When the scanner is in use, an operator (such as a person working at a supermarket checkout counter) moves an object with a bar code over the horizontal window and past the vertical window. If the bar code is located on the bottom of the object, the bar code reflects the light beam projecting out of the horizontal window. If the bar code is located on the side of the object facing the vertical window, the bar code reflects the light beam projecting out of the vertical window.

Attempts have been made to extend the reading ability of scanners beyond the bottom and one side of an object. One way to accomplish this, for example, is to have a light beam projecting out of the horizontal window at an angle, so that a bar code on some other sides of an object not facing the vertical window can be read. A light beam projecting out from near the top of the vertical window, but at a downward angle, may provide some ability to read a bar code located on the top of an object.

Heretofore, two-window scanners have used beam splitters to split a light beam from a single light source, such as a laser, into two beams. The two beams are directed at different sides of a spinning polygon mirror, which reflects the two beams toward arrays of stationary mirrors. A typical polygon mirror used in this fashion is mounted directly on a motor shaft and has three or four reflecting facets. The arrays of stationary mirrors provide paths for the two beams to form two scan patterns.

Use of a single light source with a beam splitter has several disadvantages. One disadvantage is that a single light source, such as a laser, must be powerful enough to provide two light beams of adequate intensity and therefore must operate at a higher power, which results in a shorter expected operating life. Another disadvantage is that use of a single light source with a beam splitter may be more costly to manufacture than use of two light sources with no beam splitter. This is because a system using beam splitters usually needs additional mirrors and alignment adjustments that actually are more expensive than having two light sources. Yet another disadvantage of using a single light source is that once that light source fails, the scanner becomes non-operational until the light source is replaced.

SUMMARY AND OBJECTS OF THE INVENTION

The present invention relates to a two-window scanner having a plurality of light sources. The scanner has a housing with a horizontal window and a vertical window. Each window has associated with it a light source and a polygon mirror rotated by a motor. Preferably, each window also has a separate collection system for detecting the reflection of the light beam off a bar code. The collection systems send electrical signals to a decoder, which generates a digital signal that corresponds to the bar code. Preferably, the decoder is capable of reading a bar code even if part of the bar code is scanned by one of the windows and another part of the bar code is scanned by the other window.

It is an object of the present invention to provide a two-window optical scanner having two light sources.

It is another object of the present invention to provide a two-window optical scanner with a longer operational life expectancy than previously available.

It is another object of the present invention to provide a two-window optical scanner that is capable of reading bar codes when a light source or other component malfunctions.

It is another object of the present invention to provide a two-window optical scanner that distributes heat within its housing to avoid hot spots near heat-sensitive components.

It is another object of the present invention to provide a two-window optical scanner that utilizes fewer stationary mirrors.

Another object of the present invention is a slot scanner which uses two rotating polygons, each of which is operated by its own motor.

A further object is a slot scanner which uses two lasers, one laser directed at a polygon that scans out of the vertical window, and the other laser aimed at the other polygon and scanned out of the horizontal window.

The polygon that scans the horizontal window is preferably mounted on a motor with its axis of rotation oriented vertically. The axis of rotation of the motor and polygon that scan out of the vertical window is oriented horizontally. Both polygons have four reflective sides, and preferably the sides are tilted differently with respect to the axis of rotation on the two polygons.

The two lasers may be focused differently and/or may operate at different laser powers.

As mentioned above, the scan pattern that is projected out of the horizontal window is preferably generated by the polygon that rotates about a vertical axis. This polygon is located below the horizontal window at the end of the window that is closest to the vertical window.

The polygon scans a laser beam produced by one of the lasers across an array of mirrors located around the periphery of the horizontal window. Most of these mirrors direct the scanned beam downward, away from the window towards a large mirror on the bottom of the housing. The scanned laser lines reflected off this bottom mirror pass upwards through the horizontal window where they will strike a package passing over the window.

The mirrors in the array are preferably oriented such that they produce scan lines in all the orientations needed to read a symbol passed over the window, no matter how the symbol is oriented. The symbol doesn't have to be on the bottom of the package, because the scan lines don't shoot straight up. They emerge from the window at an angle, so they can also shine on the sides of a package moving across the window.

There are lines that project on the front of a package (the side in the direction of travel), on the back of the package (opposite the front) and on the end of the package opposite the vertical window.

Some scan lines reflect off one mirror in the array to another mirror in the array and then out the window without reflecting off the large bottom mirror. This enables projection of some scan lines in different directions that can otherwise be obtained.

The use of second motor/polygon allows one to use a much simpler mirror array for the scan pattern projected from the vertical window than is possible with single polygon scanners. Preferably the design uses only four mirrors in this array. Unlike all other two-window scanners, the scan lines radiating from this second polygon (with a horizontal axis of rotation) are reflected off only a single mirror in the array passing out of the window. This makes the mirror array less expensive and also provides a stronger signal to the photodetector that senses the laser light reflected off symbols that are scanned by the vertical window. Eliminating a second mirror in the paths of the outgoing laser beams eliminates half of the losses that are due to the fact that the mirrors only reflect about 90 percent of the laser light.

Although the polygon can be mounted above the four mirrors in the array, it is understood that the scan pattern can also be generated by inverting the arrangement shown so that the polygon is below the mirror array. This inverted arrangement may enable one to separate the left and right pairs of mirrors at the center line which might open up space for two or three more mirrors that can be oriented to direct scan lines down towards the top of low objects passing over the horizontal window. Doing this, one can still retain only a single reflection of the scanned beam off of the array mirrors.

It should be noted that the array mirrors preferably do not project scan lines directly out of the window. The two mirrors on the right are preferably tilted so that the pattern they create projects towards the center line of the scanner as they leave the mirrors. Lines from the two mirrors on the left project the other way so that the lines cross in the space above the horizontal window. This allows the vertical window to read symbols not only on a side of a package parallel to the window, but also on the sides that are rotated up to around 90 degrees, around a vertical axis, with respect to the plane of the vertical window. Thus, both the horizontal and vertical windows have the ability to scan symbols on the front of a package (the side in the direction of travel of the package over the scanner) and on the back of a package. This overlapping capability assures aggressive scanning performance.

Locating the polygon that scans out the vertical window close to the vertical mirror array results in a scan pattern that grows much faster than the patterns created by single polygon scanners, which locate their polygon down low, far from the vertical pattern mirrors. In a preferred embodiment, the rapidly growing scan pattern soon becomes much higher than the window, allowing the scanner to reach higher up the sides of packages than other scanners can.

The vertical and horizontal scanning systems preferably have independent retro-reflective collection systems. The horizontal scanner uses a collection mirror located under the edge of the horizontal window furthest from the vertical window to direct light towards a photodiode mounted near the edge of the P.C. board under the motor that scans the horizontal window. The vertical scanning systems uses a lens to concentrate light onto a second photodiode mounted on the same circuit board but back under the vertical scanning mechanism. This allows the unit to share a common circuit board for both systems, which reduces manufacturing costs Each photodiode is preferably connected to its own amplifiers and digitizer. The outputs of the two digitizers both go to a decoder that is preferably designed to accept two digitized signals simultaneously.

This scanner will be used primarily to decode UPC, EAN or JAN. These symbologies can be decoded even when no signal scan line covers the whole symbol. Depending on the decode algorithm being used, symbols can be correctly decoded even if they have to be reconstructed from information obtained from up to four different scan lines. The scanner needs to work even if part of a symbol is scanned by one window and another part of the symbol is scanned by the other window. To do this, the decoder will need access to digitized data from both scan windows.

A preferred embodiment for this decoder will use two identical hardware circuits (preferably ASICs). Each circuit will monitor the digitized data arriving from one of the scanning windows. The circuits will recognize likely bar code data, or fragments of bar code data, and, using DMA circuitry, place the bar code data in memory where it can be further examined by a microprocessor. The microprocessor will discard unusable symbol fragments and assemble usable fragments into complete symbols that pass a variety of safety checks to make sure no mistake has been made. When this happens, the scanner will beep and transmit the decoded symbol to the host computer.

Notice that it is unnecessary for the decode microprocessor to have any information about which scan window a symbol fragment was scanned by. It will work if all digitized data is received from a single window, or if fragments are received from both windows.

The decoder will be preferably located on the same circuit board as the photodiodes, amplifiers, digitizers, laser power supplies, motor speed regulators, etc. This avoids the expense and unreliability associated with interconnecting multiple circuit boards.

The circuit board can preferably be located near the bottom of the scanner housing below the vertical window. This allows it to be removed easily for service by removing a cover on the bottom of the housing. Interface connectors can be mounted directly on the edge of the board and are accessible from the back of the scanner housing.

The lifetime of today's laser diodes is very dependent on temperature and optical output power. To assure that the two lasers are at least as reliable as competitors' single laser system, the lasers in the present invention are preferably operated at low output power and are kept cool.

The scanners in the prior art use beam splitters to divide the single laser beam into two beams. Each of these beams has half the optical power of the original single beam. However, each of the two half power beams must have enough power to achieve desired scanner performance. Therefore, the original beam, before being split, has to have twice as much power as is needed for desired scanner operation.

In the present invention having a two-laser system, each laser needs to have only enough power for desired operation, so the laser can operate at one half of the output power of the laser in the prior art scanners, reducing laser output power by half which increases laser life significantly.

The scanner of the present invention is also preferably designed to keep the lasers cooler than other similar scanners. The lasers are preferably located low in the housing, below warm air that floats to the top of the housing. The lasers are preferably located close to the polygons which circulate air around the laser heat sinks. Measurements show that these two things lower laser temperature several degrees below what is achieved with other designs. Laser life is heavily temperature dependent, so this significantly increases their lifetimes.

DETAILED DESCRIPTION OF THE INVENTION

Figure 1:
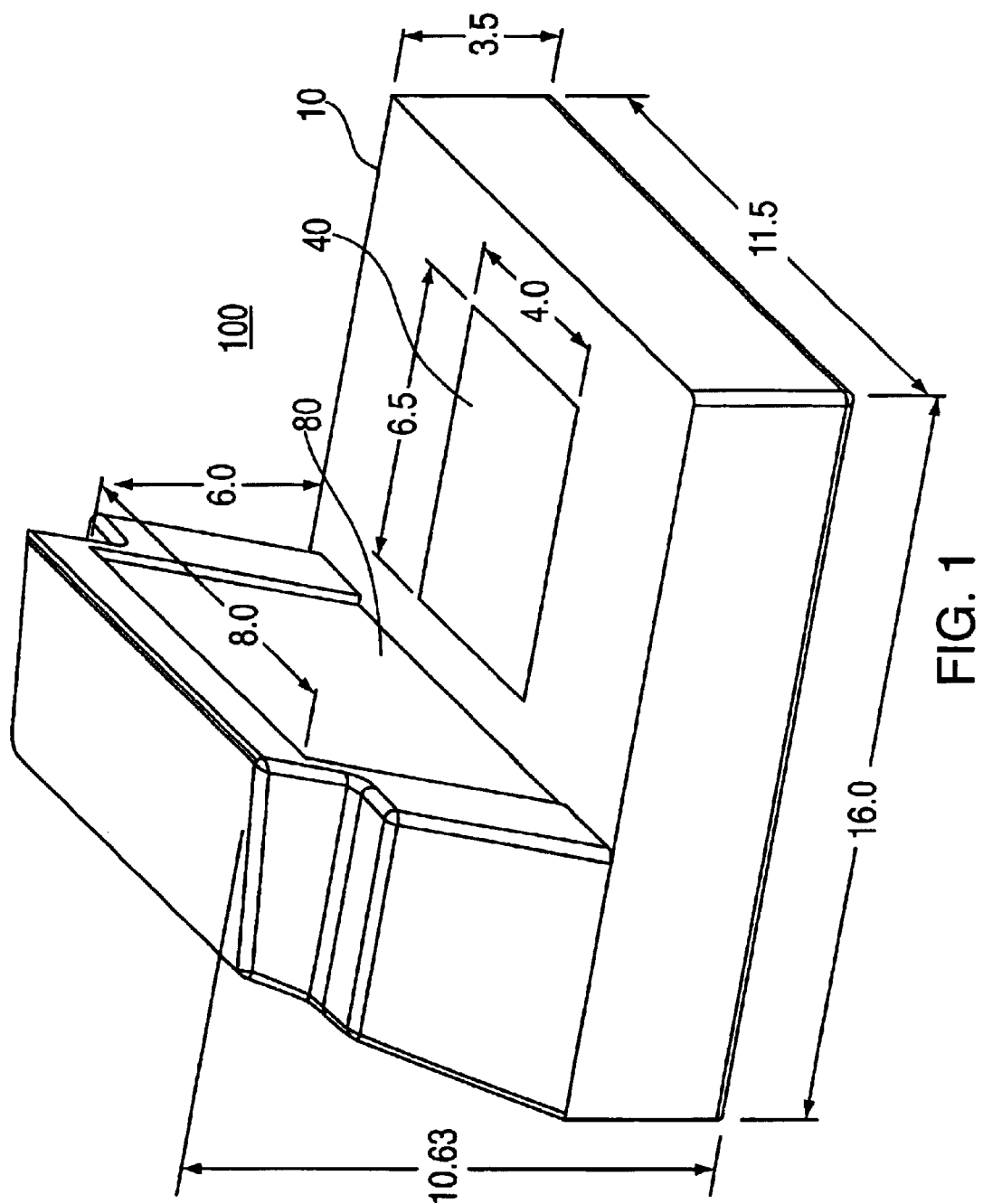
FIG. 1 is a perspective view of a two-window scanner of the present invention.

With reference to FIG. 1, a two-window optical scanner 100, having a horizontal window 40 and a vertical window 80, is shown. In a preferred embodiment shown in FIG. 2, housing 10 is partially under surface 15, which can be, for example, a supermarket check-out counter. Light source 22, preferably a laser, generates a light beam that is reflected off spherical reflector/collector 30 and onto rotating polygon mirror 32. In a preferred embodiment, rotating polygon mirror 32 has four reflecting facets, rotates around a vertical axis, and is driven by motor 33. Referring to FIG. 3, the facets of rotating polygon mirror 32 reflect the incoming light beam toward an array of mirrors H1–H8 located along the periphery of horizontal window 40. Most, but not all, of the light reflected off of array of mirrors H1–H8 in this preferred embodiment is then reflected off bottom mirror H9 and out horizontal window 40 (some of the light is reflected off mirror H1 to mirror H2 and out horizontal window 40 while some light is reflected off mirror H8 to mirror H7 and out horizontal window 40, for example).

Figure 2:
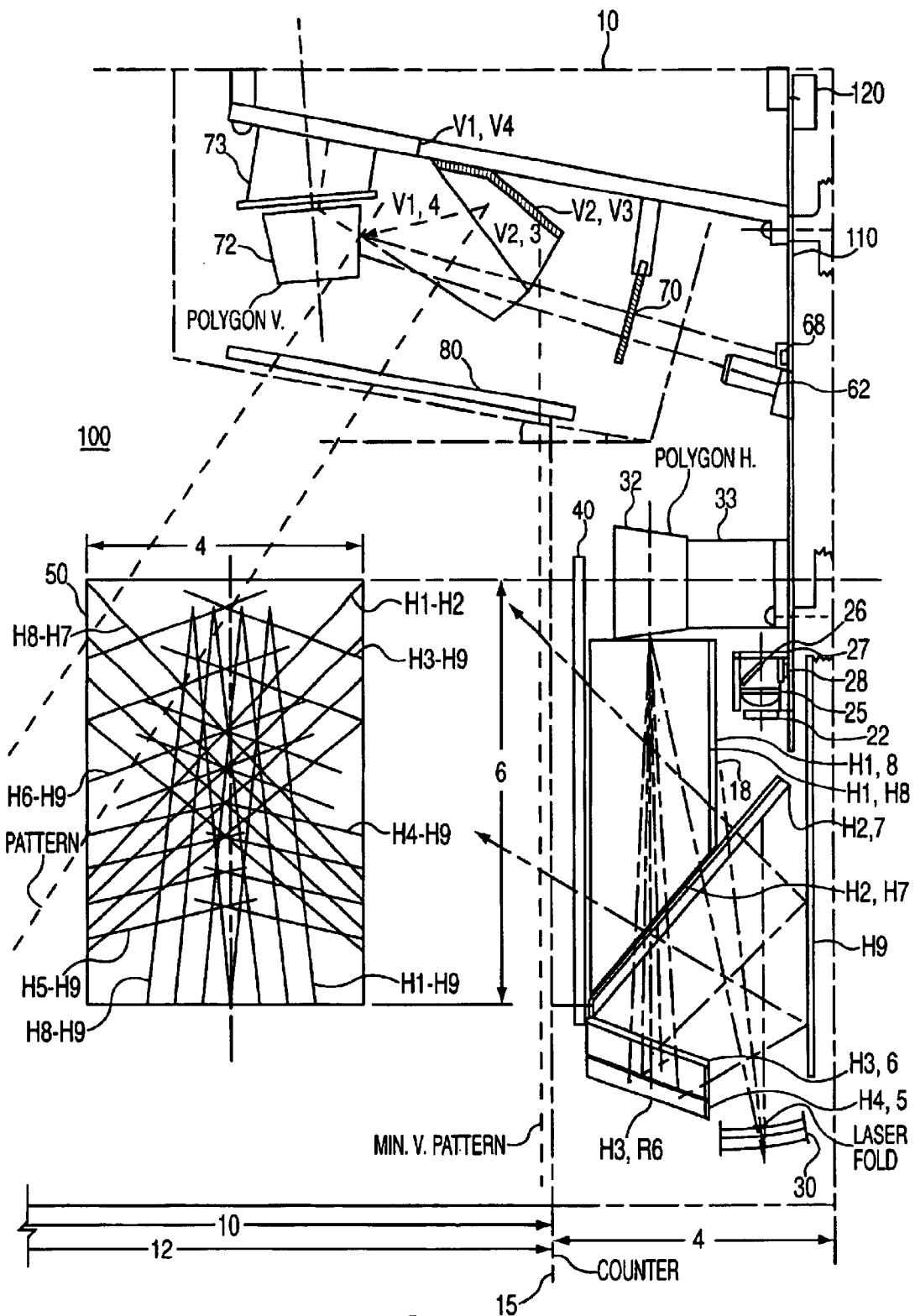
FIG. 2 is a side view of a two-window scanner of the FIG. 1 and a horizontal scan pattern.
Figure 3:
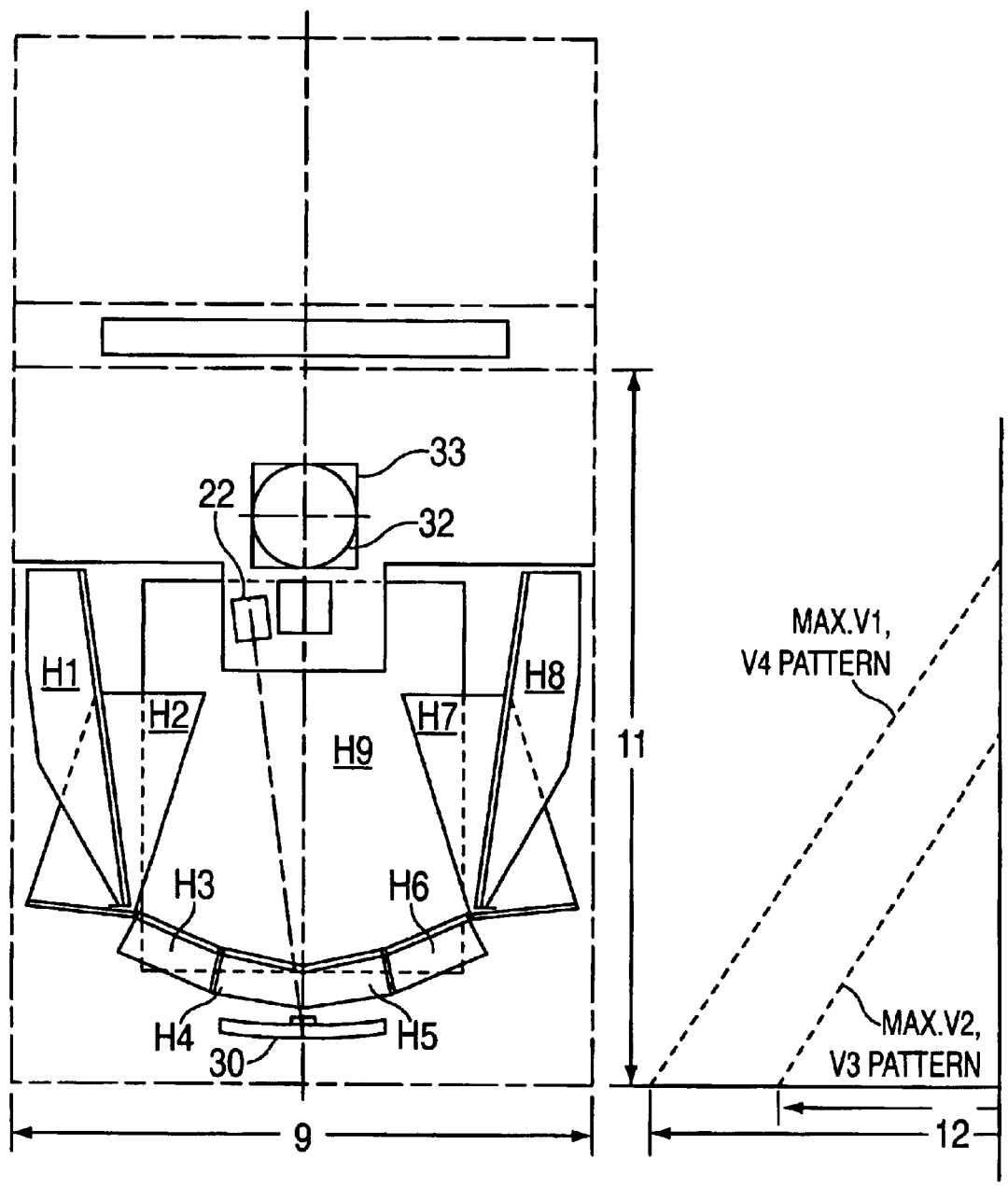
FIG. 3 is a top view of the optical layout of a light beam associated with the horizontal window of the scanner of FIG. 1.

FIG. 2 shows the horizontal scan pattern 50 for the configuration of mirrors disclosed, and scan lines corresponding to combinations of mirrors. A bar code on an object situated in horizontal scan pattern 50 reflects light back through horizontal window 40 and off at least some of mirrors H1–H9 to rotating polygon mirror 32 and spherical reflector/collector 30. This light reflects off spherical reflector/collector 30 and onto collection assembly 23, which comprises lens 25, fold mirror 26, filter 27, and photodiode 28.

Since the light leaving horizontal window 40 approaches horizontal scan pattern 50 at different angles, a bar code being scanned need not be on the bottom of an object—it could very well be on the front or back or a side of the object. For example, it may be easier for light beams not reflecting off of bottom mirror H9 to read bar codes on the front or back of an object (though this does not exclude the possibility that light beams reflecting off bottom mirror H9 will read such bar codes). Also, since the scan lines in horizontal scan pattern 50 are at various angles, any orientation of the bar code can be scanned.

Figure 4:
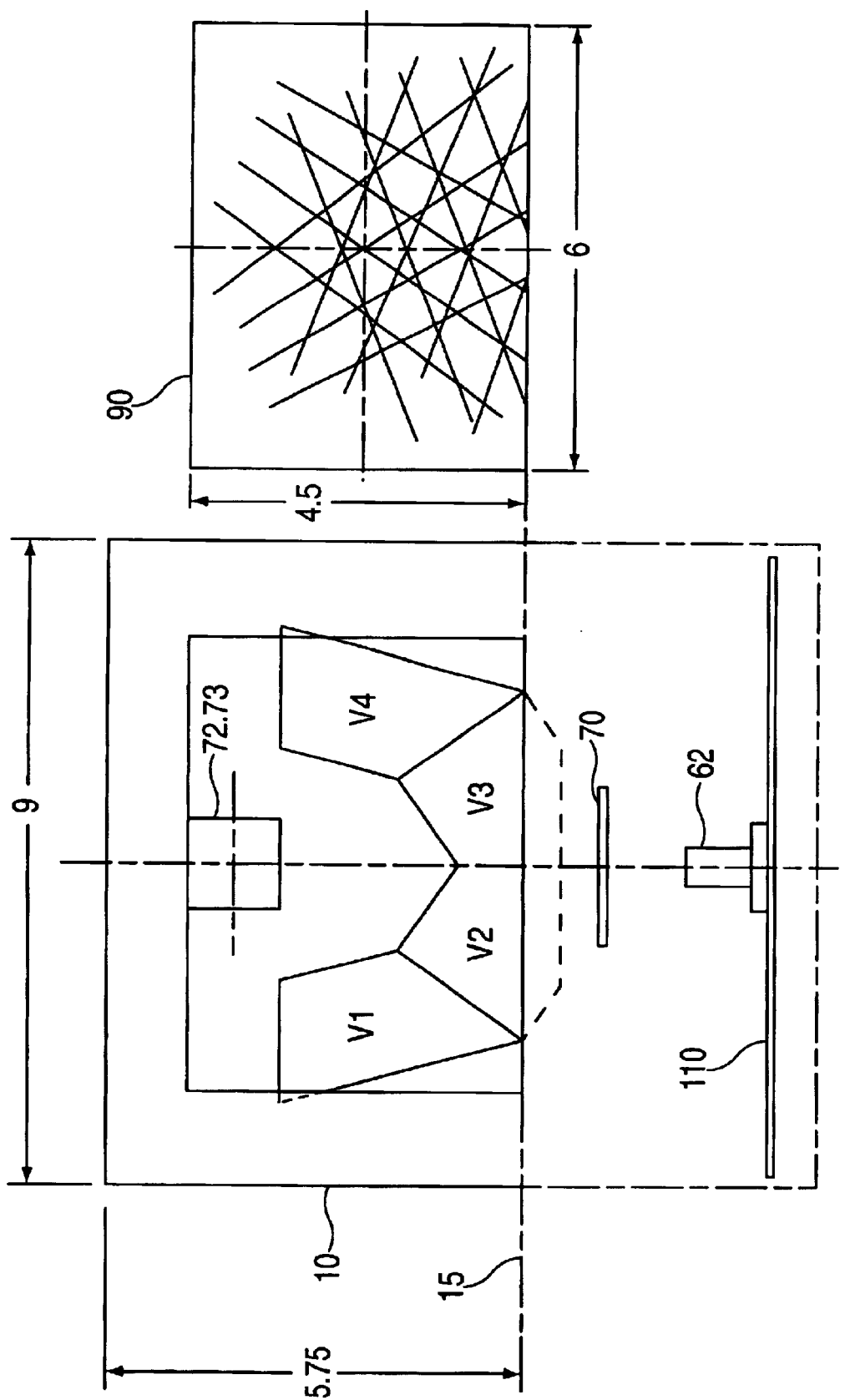
FIG. 4 is a head-on view of the optical layout of a light beam associated with the vertical window of the scanner of FIG. 1 and a vertical scan pattern.

Light source 62, preferably a laser, generates a light beam that shines on rotating polygon mirror 72. In a preferred embodiment, rotating polygon mirror 72 has four reflecting facets, rotates around a horizontal axis, and is driven by motor 73. Referring to FIG. 4, the facets of rotating polygon mirror 72 reflect the incoming light beam toward an array of mirrors V1–V4 located along the periphery of vertical window 80 and out vertical window 80.

FIG. 4 shows the vertical scan pattern 90 for the configuration of mirrors disclosed. A bar code on an object situated in vertical scan pattern 90 reflects light back through vertical window 80 and off at least some of mirrors V1–V4 to rotating polygon mirror 72, which then reflects it toward collector lens 70 and photodiode 68.

Since the light leaving vertical window 80 approaches vertical scan pattern 90 at different angles, a bar code being scanned need not be on the side of the object facing vertical window 80—it could very well be on the front or back of the object, by way of example only. Also, since the scan lines in vertical scan pattern 90 are at various angles, any orientation of the bar code can be scanned.

Various features of the embodiment described above are used to further improve performance, drive down cost, etc. For example, in a preferred embodiment the facets of rotating polygon mirror 32 may be tilted at different angles with respect to the axis of rotation; similarly, the facets of rotating polygon mirror 72 may also be tilted at different angles with respect to their axis of rotation. Light source 22 and light source 62 may be focused differently and/or may operate at different power. In the preferred embodiment shown, for example, some of the light generated by light source 22 is reflected off more surfaces than the light generated by light source 62, and so it may be advantageous for light source 22 to operate at a higher power.

In an alternative preferred embodiment, the positions of rotating polygon mirror 72 and array of mirrors V1–V4 is inverted so that rotating polygon mirror 72 is below array of mirrors V1–V4. Such an arrangement enables mirrors V1, V2 to be shifted to the left and mirrors V3, V4 to be shifted to the right so that additional mirrors may be placed in between. These additional mirrors can be oriented so that they direct scan lines down toward the top of low objects being passed over horizontal window 40.

Locating rotating polygon mirror 72 close to array of mirrors V1–V4 results in a scan pattern that grows faster than patterns created by single polygon mirror scanners, which typically locate their rotating polygon mirrors lower in the housing, far from a vertical array of mirrors. In a preferred embodiment of the present invention, a rapidly growing vertical scan pattern 90 grows higher than vertical window 80, allowing two-window optical scanner 100 to read bar codes located higher up on the sides of objects being passed through.

In a preferred embodiment, the vertical and horizontal scanning systems disclosed have independent retro-reflective collection systems. The horizontal component of two-window optical scanner 100 uses spherical reflector/collector 30 to direct light toward photodiode 28. The vertical component of two-window optical scanner 100 uses collector lens 70 to focus light onto photodiode 68. In a preferred embodiment, light source 22, collection assembly 23, light source 62, and photodiode 68 are all mounted on a single printed circuit board 110 near the bottom of housing 10, reducing manufacturing costs and allowing easy removal.

In a preferred embodiment, photodiode 28 and photodiode 68 each has its own amplifier and digitizer, and the outputs of the two digitizers go to a decoder designed to accept two digitized signals simultaneously. In a preferred embodiment the decoder is also mounted on printed circuit board 110, and connects to a host computer by way of connectors 120.

Two-window optical scanner 100 may be used to read and decode a large variety of bar code symbols. In a preferred embodiment, bar code symbols conforming to at least the UPC, EAN, or JAN standards are read and decoded. These symbologies can be decoded even when no scan line covers the whole symbol. Depending on the decode algorithm being used, symbols can be accurately decoded even if they need to be reconstructed from information obtained from up to four scan lines. Preferably, the decoder used to decode signals from photodiodes 28, 68 uses the information from both photodiodes so that if part of bar code is scanned through horizontal window 40 and another part of the bar code is scanned through vertical window 80, the bar code can nevertheless be decoded.

In a preferred embodiment, the decoder uses two substantially identical hardware circuits (such as ASICs). Each circuit monitors digitized data arriving from one of the photodiodes. Using DMA or other circuitry, bar code data or fragments of bar code data is recognized and placed in a memory where the information can be further analyzed by a microprocessor. Preferably, the microprocessor discards unusable symbol fragments and assembles usable fragments into complete symbols that pass a variety of safety checks to ensure that the bar code has been read accurately. It would not be necessary for the microprocessor to have information on which scan window was used to scan a bar code or bar code fragment. A beep may indicate that a successful scan has been accomplished, and information related to the decoded bar code symbol may be transmitted to a host computer.

As indicated above, in a preferred embodiment light source 22 and light source 62 are lasers. Since two lasers are used, each one uses less power than a single laser generating two light beams (using a beam splitter) and thus operates cooler and can expect to have a longer operating life. Other methods of extending laser life in a preferred embodiment include: use of heat sinks, low placement of the lasers within housing 10 to avoid warm air that tends to float to the top of housing 10, and placement of the lasers close to rotating polygon mirrors 32, 72 that act like fans to circulate air around the lasers and/or their heat sinks. Advantageously, if one of the lasers (or other component, such as a motor by way of example only) does happen to fail, two-window optical scanner 100 can operate using only one window.

Figure 5:
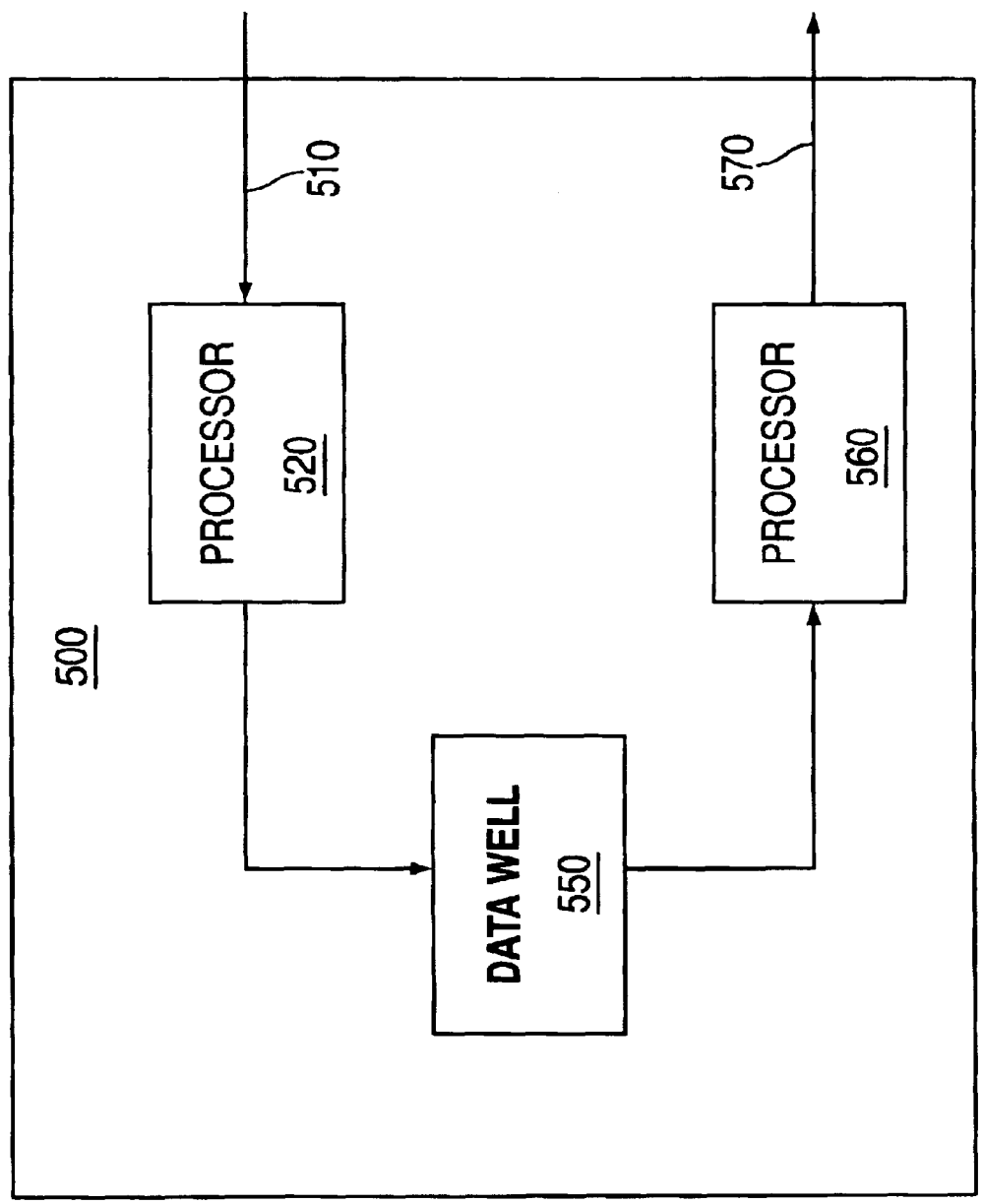
FIG. 5 is a representation of a docking well used to interface a two-window scanner and a hand-held scanner.

In a preferred embodiment, other features of the present invention include a display or other indicator for indicating that only one of the scanning mechanisms is functioning. Additionally, a user may wish to connect a hand-held scanner (by means of a cable, radio, infrared, or other connection means) that does not have its own decoder to two-window optical scanner 100. Using a trigger such as a switch, the scanning mechanisms within two-window optical scanner 100 may be disconnected from, and the hand-held scanner connected to, the decoding circuitry within housing 10. Similarly, light sources 22, 62 may be powered off when the hand-held scanner is connected or being used. Additionally, a docking well 500 in or on two-window optical scanner 100 that is receptive of a hand-held scanner and has the functions shown in FIG. 5 may be used to interface two-window optical scanner 100 and the hand-held scanner. Signal 510 from a hand-held scanner is converted to data via input processor 520 for storage in data well 550.

The data in data well 550 is retrieved by processor 560 and sent as signal 570 to two-window optical scanner 100. In an alternative preferred embodiment, two-window optical scanner 100 may comprise, or be attached to, a base station, such as the base stations disclosed in U.S. Pat. No. 5,668,803, incorporated herein by reference, for use with a cordless scanner.

The present invention has been illustrated and described with respect to specific embodiments thereof. It is to be understood, however, that the above-described embodiments are merely illustrative of the principles of the invention and are not intended to be exclusive embodiments.

Alternative embodiments capturing variations in the enumerated embodiments disclosed herein can be implemented to achieve the benefits of the present invention.

It should further be understood that the foregoing and many various modifications, omissions and additions may be devised by one skilled in the art without departing from the spirit and scope of the invention.

It is therefore intended that the present invention is not limited to the disclosed embodiments but should be defined in accordance with the claims which follow.

What is claimed is:

1. A scanning device for reading bar code symbols comprising:

a housing having a substantially horizontal surface with a substantially horizontal window and a substantially vertical surface having a substantially vertical window;

a first rotatable polygon mirror and a first stationary mirror array;

a first light source for generating a first light beam that reflects off said first polygon mirror to project a first plurality of scan lines through said substantially horizontal window;

a rotatable second polygon mirror and a second stationary mirror array;

a second light source for generating a second light beam that reflects off said second polygon mirror to project a second plurality of scan lines through said substantially vertical window;

a plurality of sensors for detecting the intensity of light from the first and second plurality of scan lines reflected by a bar code symbol and for generating electrical signals proportional to the intensity of said reflected light; and an indicator for indicating that said substantially vertical window is to be used when a component related to said first light source fails and for indicating that said substantially horizontal window is to be used when a component related to said second light source fails.

2. The optical scanner of claim 1, further comprising: a single microprocessor for decoding the electrical signals from the plurality of sensors.

3. The optical scanner of claim 2, further comprising signal processing circuitry and wherein the microprocessor and signal processing circuitry are disposed on a single printed circuit board.

4. The optical scanner of claim 1, wherein said first motor has a substantially vertical axis of rotation and said second motor has a substantially horizontal axis of rotation.

5. The optical scanner of claim 1, wherein said first plurality of scan lines and said second plurality of scan lines are configured to scan the front and back of a package in the direction of travel across the scanner.

6. The optical scanner of claim 1, wherein said first light source and said second light source focused differently.

7. The optical scanner of claim 1, wherein each of the sources are lasers operating at less than full power.

8. The optical scanner of claim 1, wherein said first light source and said second light source are situated in substantially low positions within said housing.

9. The optical scanner of claim 1, wherein said second polygon mirror is situated above the second stationary mirror array.

10. The optical scanner of claim 1, wherein said second polygon mirror is situated close to the second stationary mirror array to allow a scan pattern produced by said second light beam to grow rapidly.

11. The optical scanner of claim 1, wherein all the second plurality of scan lines are each reflected only once off the second stationary mirror array.

12. The optical scanner of claim 1, wherein said first motor and said second motor rotate at different speeds.

13. The optical scanner of claim 1, wherein air circulated by at least one of said first polygon mirror and said second polygon mirror is used to cool at least one of said first light source and said second light source.

14. A scanning device for reading bar code symbols comprising:

a housing having a first surface with a first window and a second surface with a second window;

first and second mirror assemblies respectively associated with the first and second windows;

a first light source generating a first light beam that reflects off said first mirror assembly to project a first plurality of scan lines through said first window;

a second light source generating a second light beam that reflects off said second mirror assembly to project a second plurality of scan lines through said second window;

a plurality of sensors for detecting the intensity of light from the first and second plurality of scan lines reflected by a bar code symbol and for generating electrical signals proportional to the intensity of said reflected light; and an indicator for indicating that said second window is to be used when a component related to said first light source fails and for indicating that said first window is to be used when a component related to said second light source fails.

15. The scanning device of claim 14, wherein the first and second windows are angled relative to each other.

16. The scanning device of claim 15, wherein the first window is substantially horizontal and the second window is substantially vertical.

* * * * *